March 4, 1952     F. G. HODSDON     2,587,846
MOVABLE FEED SHIELD FOR MILKER STALLS
Filed April 15, 1950     2 SHEETS—SHEET 1
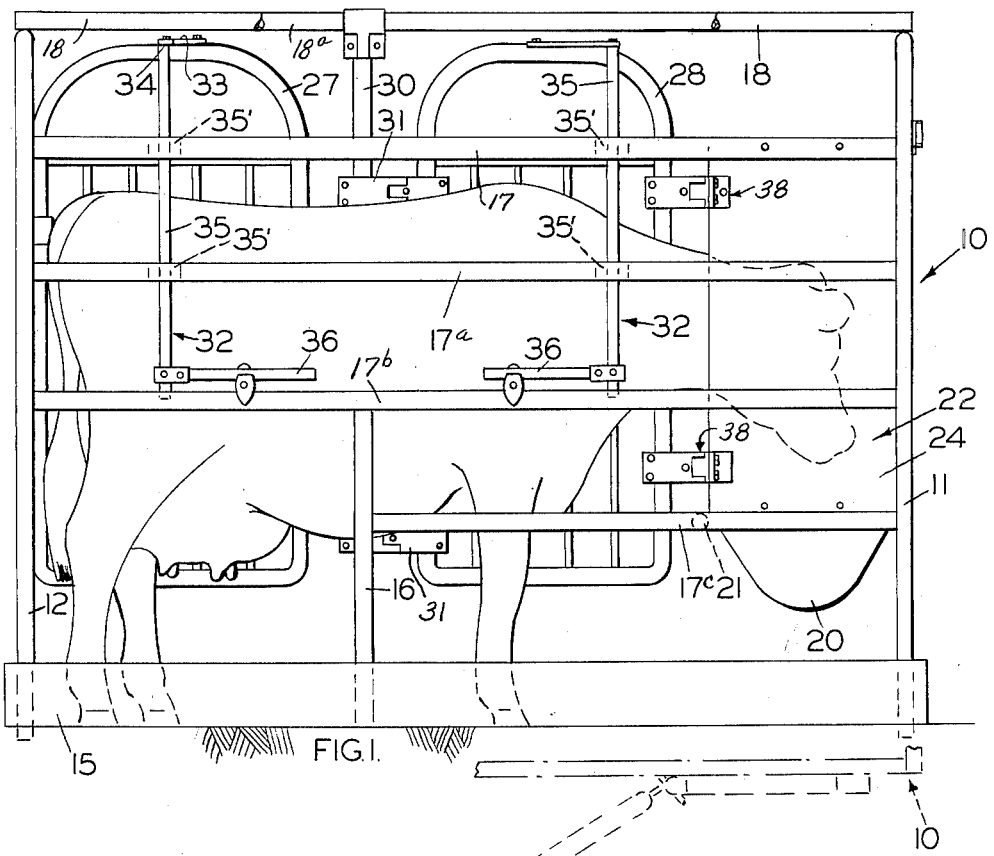
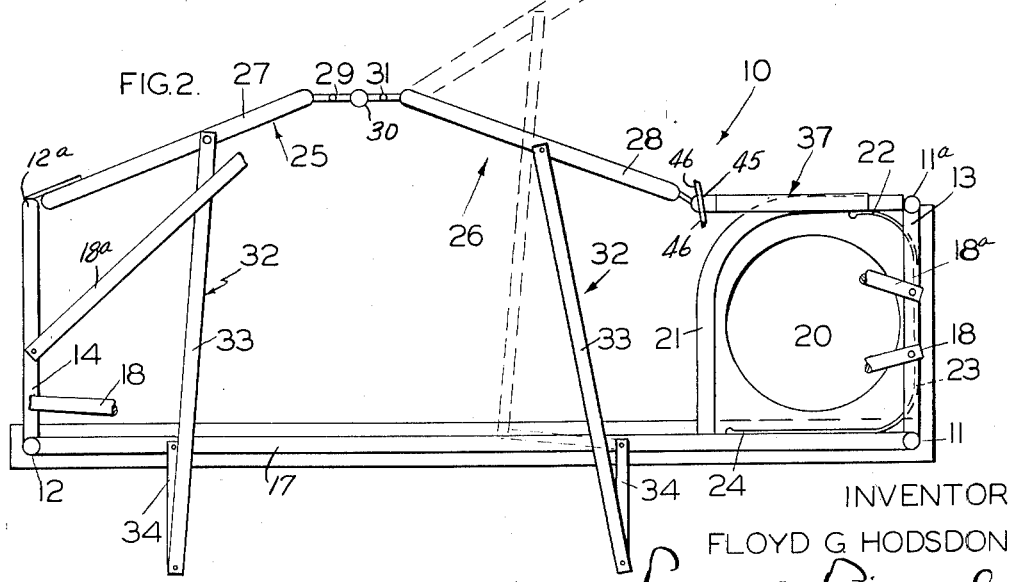
INVENTOR
FLOYD G. HODSDON
ATT'Y March 4, 1952 F. G. HODSDON 2,587,846
MOVABLE FEED SHIELD FOR MILKER STALLS
Filed April 15, 1950 2 SHEETS—SHEET 2
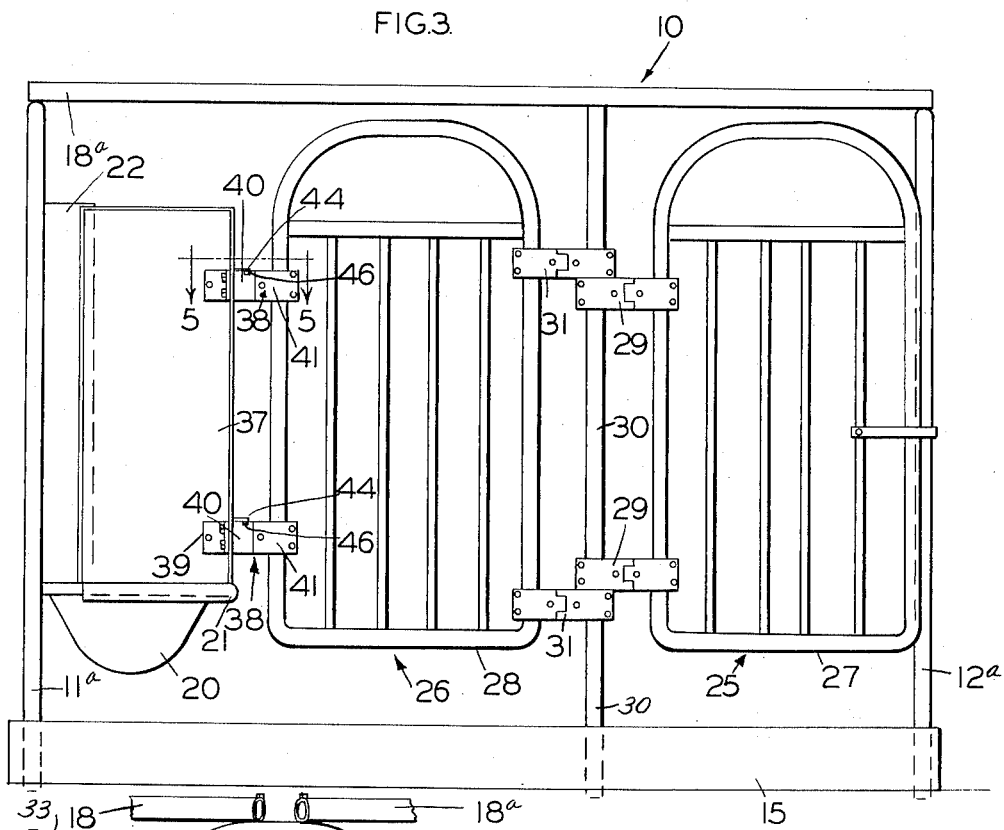
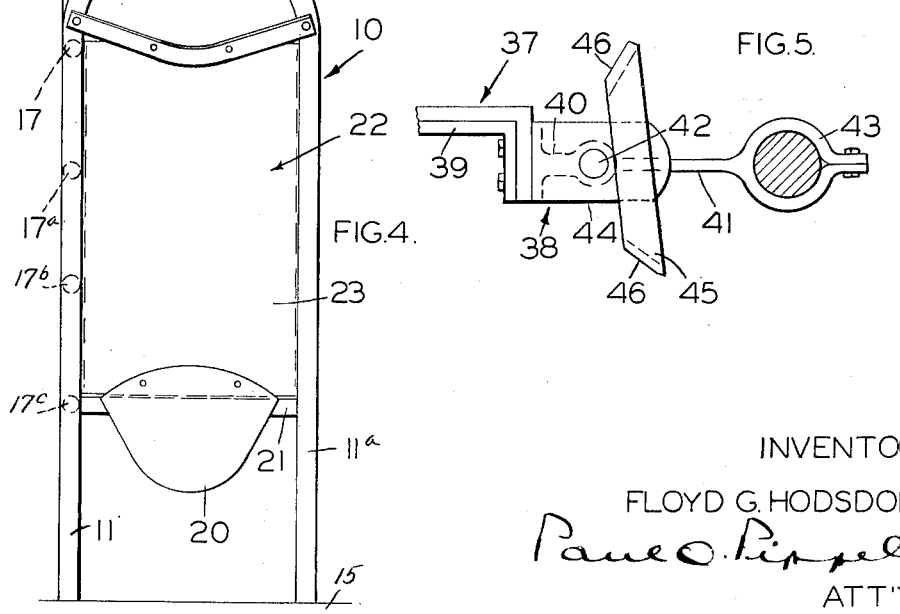
INVENTOR
FLOYD G. HODSDON
Paul O. Pippel
ATT'Y Patented Mar. 4, 1952

2,587,846

UNITED STATES PATENT OFFICE 2,587,846

MOVABLE FEED SHIELD FOR MILKER STALLS

Floyd G. Hodsdon, Milwaukee, Wis., assignor to International Harvester Company, a corporation of New Jersey Application April 15, 1950, Serial No. 156,100

8 Claims. (Cl. 119—27)

This invention relates to an improved animal retaining enclosure. More particularly, the invention relates to a new stall of a type especially adapted to enclose and retain a cow during a milking operation.

In the dairy system wherein the milking parlor arrangement is utilized, the cows are generally herded into a series of stalls which are positioned in side to side relation within a milking parlor or enclosure. The cows are then milked in these stalls and after the milking operation they are discharged at once so that subsequent animals may be processed. The type of stalls generally utilized consist of a skeleton structure or frame which may be formed of tubular uprights and horizontals which are connected together to form a generally rectangularly shaped enclosure. The enclosure includes entrance and exit openings through which the animals travel to and from the milking operation. Each stall is generally of a length adequate to accommodate the largest animal, the structure, however, being kept within sufficient length limitations so that the animal may be retained in substantially the same position during the milking operation. The front end of the stall is usually provided with a feed trough from which the animal may secure feed during its confinement. The wasteful feeding habits of a cow are well-known and it is extremely desirable, therefore, to provide an adequate shielding means around the feed receptacle so that as much feed as possible may be conserved and retained within the feed receptacle. It is a prime object of this invention, therefore, to provide an improved cow stall having an adequate shielding structure for shielding the feed receptacle.

It is another object to provide an improved milking stall having entrance and exit gates, the exit gate containing a hinged movable shield which is effective to cooperate with a stationary shielding structure to adequately shield the receptacle against the displacement of feed from the stall.

A further object is to provide a shielding structure for properly shielding a feed enclosure of a milk stall, the shielding structure including a movable shield which may be moved adjacent to and away from a feed trough, the shield being hinged to the closure gate so that it may be moved to an open position with the gate, therefore facilitating the movement of a cow from a milker stall.

These and other objects will become more readily apparent from a reading of the specification when examined in connection with the accompanying drawings.

In the drawings:

Fig. 1 is a side view in elevation of a milking stall, the view being taken to show the closed side of the stall.

Fig. 2 is a plan view of the milking stall shown in Fig. 1.

Fig. 3 is a side elevational view of a milker stall showing a side having openings through which animals may enter and leave the stall.

Fig. 4 is a front view of a milking stall.

Fig. 5 is a detail sectional view of a hinging mechanism for supporting a shield on a gate taken along the line 5—5 of Fig. 3.

Referring particularly to Figs. 1 and 2, a cow stall is generally designated by the reference character 10. The cow stall 10 consists of a plurality of transversely spaced front upright bars 11 and 11a and rear transversely spaced upright bars 12 and 12a. As best shown in Figs. 2 and 4 the upright bars 11 and 11a and 12 and 12a are suitably connected by arcuate portions 13 and 14 respectively, extending transversely across the cow stall 10. The front upright bars 11 and 11a and rear upright bars 12 and 12a may be suitably fastened in a concrete footing or a barn floor as indicated by the reference character 15.

The side of the cow stall 10 shown in Fig. 1, may be considered as the closed side since this side does not have any ingress or egress openings. The closed side includes a vertical support 16 which is suitably supported in the concrete footing 15. A plurality of horizontally extending bars 17, 17a, and 17b are connected at their respective ends to the upright bars 11 and 12 as best shown in Figs. 1 and 4. The upper end of the support 16 is suitably connected to the bar 17b and the ends of the bar 17c are respectively connected to the support 16 and the upright bar 11. The upper end of the stall is provided with longitudinally extending and laterally spaced supports 18 and 18a which may be suitably connected to the arcuate bars 13 and 14 as shown in Fig. 2.

The forward end of the cow stall 10 is provided with a feed trough or receptacle 20 which is securely positioned within the cow stall by means of a tubular support 21 that is securely connected to the horizontal bar 17c at one end and to the front upright bar 11a at its other end. An L-shaped shield 22 is provided for shielding two sides of the receptacle 20. The L-shaped shield includes a portion 23 extending transversely across the front end of the cow stall 10, this portion shielding the receptacle against the possibility of feed being thrown outwardly of the front end of the stall. The L-shaped shield 22 also includes a portion 24 which extends rearwardly or longitudinally with the horizontal bars 17, 17a, 17b and 17c on the closed side of the stall 10.

Referring particularly to Figs. 2 and 3, the open side of the stall is clearly illustrated. The term "open side" is utilized since this side includes an entrance opening 25 and an exit opening 26 which accommodates passage of an animal to and from the stall. The entrance opening 25 and exit opening 26 are respectively provided with entrance gates 27 and exit gates 28. The entrance gate 27 is supported on a pair of vertically spaced hinge structures 29 which in turn are supported by a vertical beam 30 which may have its lower end firmly anchored in the footing 15 and its upper end fastened to the top supporting member 18a as best indicated in Fig. 3. The exit gate 28 is also suitably supported for hinging movement on a pair of vertically spaced hinge structures 31, these hinge structures 31 also being firmly supported by the vertical beam 30.

As best shown in Figs. 1 and 2, the entrance and exit gates 27 and 28 each are provided with an actuating mechanism 32 whereby the gates may be opened by an operator standing on a closed side of the stall 10. Each actuating mechanism 32 consists of a bar 33 which extends transversely across the top of the stall 10. The bars 33 are pivotally connected to the gates and each bar 33 is pivotally connected to a jack-knife link 34 which in turn is rigidly connected to a vertical shaft 35. The vertical shaft 35 may be suitably journaled by brackets 35' supported on certain of the horizontal bars 17.

A handle 36 is rigidly connected to the shaft 35, the handle 36 being adapted to be gripped by by an operator and moved for rotating the shaft 35 to actuate the jack-knife link 34 to exert a transverse force against the bar 33, thereby moving the respective gate to which the bar 33 is attached. This construction may be considered conventional and is provided so that the operator can easily manipulate the gates from the closed side of the stall, thereby permitting the entrance and exit of the animals.

As best shown in Figs. 2, 3 and 5 a movable feed shield 37 is adapted to be positioned in cooperating relation to the stationary L-shaped shield 22 to effectively shield the receptacle 20 at the front end of the cow stall 10. The movable feed shield, like the L-shaped shield 22, extends vertically upwardly and is so positioned that the head of the animal is also shielded during its feeding. The shield 37 is suitably connected by vertically spaced hinge structures 38 to the exit gate 28. The shield 37 is securely connected to the hinge structure 38 by vertically spaced brackets 39 which are rigidly secured to the shield 37. The shield 37 by means of the brackets 39, is connected to hinging members 40 which in turn are hingedly connected to hinge brackets 41 by means of hinge pins 42. As indicated at 43, the hinge structures 38 are rigidly secured to an outer edge of the exit gate 28.

By this arrangement it can readily be seen that the shield 37 may hinge relative to the gate 28 which in turn is hingedly supported on the hinge structure 31. The degree of hinging movement of the shield 37 is limited by means of suitable brackets 44 which are connected in relative vertically spaced relation adjacent the hinge members 40. Each stop bracket 44 comprises a U-shaped stop 45 having depending legs 46. The legs 46 are so arranged that when the shield 37 is hingedly moved the bracket 44 also is moved with the shield 37 and the depending legs 46 engage the sides of the hinge brackets 41, thereby limiting the hinging movement of the shield 37 with respect to the gate 28.

In the use of the stall 10 the animal enters into the stall through the opening 25 whereupon the gate 27 is closed. In this position as shown in Figs. 2 and 3 the shield 37 is positioned immediately adjacent to the receptacle 20 in such a manner that it cooperates with the stationary shield 22 to provide a complete guard around the receptacle and thus prevent the feed from being thrown outwardly of the stall by the animal. It can be seen that the shield 37 extends a considerable distance vertically so that it provides effective means whereby the animal's head will be completely shielded. After the animal has been milked the gate 28 is moved outwardly so that the animal can move through the exit opening 26. Since the shield 37 also moves outwardly the exit opening is in effect enlarged exposing an opening which extends from the vertical beam 30 forwardly to the front upright bar 11a. Exit of the animal is thus afforded without the necessity of the animal shifting its position prior to such exit. In other words, the animal can easily walk out of the stall through the large open egress space provided.

As best shown in dotted lines in Fig. 2 these stalls are generally positioned adjacent to one another. Since the shield 37 is hingedly connected to the gate 28 the shield upon opening of the gate 28 will engage a closed side of an adjacent stall 10 whereupon the shield 37 will hingedly move with respect to the gate 28 and the gate 28 may be moved to its widest open position, this position being limited by the proximity of the adjacent stall. By the utilization of the hinged shield 37 the stalls may be placed relatively close and adjacent to one another and yet provide a sufficient space for the cow to effect an exit. It is believed the advantages of the hinged feed shield are thus accurately set forth and it is apparent that a novel shielding arrangement has been provided, the shielding arrangement also facilitating the exit of an animal from a milking stall or enclosure.

It must be understood that changes and modifications may be made without departing from the spirit of the invention shown in this preferred embodiment nor from the scope thereof as defined in the appended claims.

What is claimed is:

1. In an animal stall, upright and horizontally extending frame members connected together to provide a skeleton frame having front and rear end portions, a feed receptacle positioned at the front end portion within the frame, said frame having an entrance opening and an exit opening on one side thereof, the entrance opening being situated at the rear end of the frame and the exit opening being situated at the front end of the frame, entrance and exit gates hingedly connected to the frame for respectively closing the entrance and exit openings, a stationary shield connected to the frame adjacent the feed receptacle, said shield having one portion extending across the front end of the frame, and a second portion extending rearwardly on one side of the frame, a movable shield positioned adjacent the feed receptacle, the movable shield normally cooperating with said stationary shield to provide a feed retaining structure about the front end of the frame, and means hingedly connecting said movable shield to the exit gate whereby the movable shield may be moved from its feed retaining position upon opening of said exit gate thereby enlarging the exit opening.

2. In an animal stall, upright and horizontally extending frame members connected together to provide a retaining frame having front and rear end portions, one side of said frame having an opening near the front end thereof, a feed receptacle adjacent the front end of the frame, a stationary feed shield supported adjacent the receptacle, the shield having a portion extending across the front end of said frame and rearwardly along the frame on a side of the frame opposite said opening, a movable feed shield normally positioned adjacent to the receptacle, a closure gate for the opening in said frame, and means hingedly connecting said movable shield to said closure gate, whereby the movable shield may be swung with the gate out of shielding relation with respect to said receptacle to accommodate movement of an animal with respect to said stall.

3. In an animal stall, upright and horizontally extending frame members connected together to provide a retaining frame having front and rear end portions and closed and open sides, a gate hingedly connected to the open side to provide a closure therefor, a feed receptacle adjacent the front end of the frame, a feed retaining shield across the front end of the frame, said shield having a portion connected to and extending rearwardly along the closed side, a movable feed retaining shield connected to the frame adjacent the receptacle along the open side, and means hingedly connecting the movable shield to the gate whereby the shield may be swung out of shielding relation with respect to said receptacle to an open position to accommodate movement of an animal through the open side.

4. In an animal stall, upright and horizontally extending frame members connected together to provide a retaining frame having front and rear end portions and closed and open sides, a gate hingedly connected to the open side to provide a closure therefor, a feed receptacle adjacent the front end of the frame, a feed retaining shield at the front end of the frame, said shield extending longitudinally along the closed side, a movable feed retaining shield connected to the frame adjacent the receptacle along the open side, and means connecting the movable shield to the gate whereby the shield may be swung out of shielding relation with respect to said receptacle to an open position to accommodate movement of an animal through the open side.

5. In an animal stall, a frame enclosure having an entrance opening and an exit opening, entrance and exit gates hingedly mounted on the frame for respectively closing the openings, a feed receptacle positioned at one end of the stall, a stationary feed shield carried by the frame at one side of and adjacent to the feed receptacle, a movable feed shield disposed opposite the stationary shield adjacent the feed receptacle and means hingedly connecting the movable feed shield to the exit gate, whereby the movable feed shield may be hingedly swung with the exit gate to an open position, the feed shield being movable from a shielding position with respect to the receptacle to facilitate movement of one animal through the exit opening.

6. In an animal stall, upright and horizontally extending frame members connected together to provide a retaining frame having front and rear end portions, one side of said frame having an opening near the front end thereof, a feed receptacle adjacent the front end of the frame, a stationary feed shield supported adjacent the receptacle, the shield having a portion extending longitudinally along the frame on a side of the frame opposite said opening, a movable feed shield normally positioned adjacent to the receptacle opposite the stationary shield, a closure gate for the opening in said frame, and means connecting said movable shield to said closure gate, whereby the movable shield may be swung with the gate out of shielding relation with respect to said receptacle to accommodate movement of an animal with respect to said stall.

7. In an animal stall, upright and horizontally extending frame members connected together to provide a skeleton frame having front and rear end portions, a feed receptacle positioned at the front end portion within the frame, said frame having an entrance opening and an exit opening on one side thereof, the entrance opening being situated at the rear end of the frame and the exit opening being situated at the front end of the frame, entrance and exit gates hingedly connected to the frame for respectively closing the entrance and exit openings, a stationary shield connected to the frame adjacent the feed receptacle, said shield having a portion extending longitudinally on one side of the frame, a movable shield positioned adjacent the feed receptacle opposite the stationary shield, the movable shield normally cooperating with said stationary shield to provide a feed retaining means at the front end of the frame, and means connecting said movable shield to the exit gate whereby the movable shield may be moved from its feed retaining position upon opening of said exit gate thereby facilitating movement of an animal therethrough.

8. In an animal stall, a frame enclosure having an opening, a gate connected to the frame for closing the opening, a feed receptacle positioned at one end of the stall, a stationary feed shield carried by the frame at one side of and adjacent to the feed receptacle, a movable feed shield disposed on a side opposite to the stationary shield adjacent the feed receptacle and means connecting the movable feed shield to the exit gate, whereby the movable feed shield may be moved with the exit gate to an open position, the feed shield being movable from a shielding position with respect to the receptacle to facilitate movement of an animal through the exit opening.

FLOYD G. HODSDON.

REFERENCES CITED

The following references are of record in the file of this patent:

UNITED STATES PATENTS

| Number | Name | Date |
|---|---|---|
| 1,297,974 | Louden | Mar. 18, 1919 |
| 2,050,527 | Grabe | Aug. 11, 1936 |
| 2,528,255 | Thomas | Oct. 31, 1950 |